United States Patent
Thomas

Patent Number: 6,137,084
Date of Patent: Oct. 24, 2000

[54] HEATING ELEMENT FOR HEATED WINDSHIELD WIPER

[76] Inventor: Paul Douglas Thomas, 1611 Mustang, Amarillo, Tex. 79102

[21] Appl. No.: 09/167,741

[22] Filed: Oct. 7, 1998

[51] Int. Cl.[7] ..................................................... B60L 1/02
[52] U.S. Cl. ................... 219/202; 15/250.06; 15/250.05
[58] Field of Search ..................................... 219/202, 543, 219/544, 546, 548, 549; 174/84 R, 93, 74 A, 91; 439/86, 90; 15/250.05, 250.06, 250.07, 250.08, 250.09

[56] References Cited

U.S. PATENT DOCUMENTS

| | | | |
|---|---|---|---|
| 4,192,989 | 3/1980 | Jeromin | 219/216 |
| 4,325,160 | 4/1982 | Burgess | 15/250.06 |
| 5,221,828 | 6/1993 | Basheer et al. | 219/202 |
| 5,325,561 | 7/1994 | Kotlar | 219/202 |
| 5,504,965 | 4/1996 | Guell | 219/202 |
| 5,521,358 | 5/1996 | Eilentropp | 219/549 |
| 5,539,951 | 7/1996 | Guell et al. | 219/202 |
| 5,558,792 | 9/1996 | Gauharou | 219/202 |
| 5,649,337 | 7/1997 | Lobner | 219/202 |
| 5,676,868 | 10/1997 | Simmons | 219/202 |
| 5,749,118 | 5/1998 | Holland | 219/202 |
| 5,826,293 | 10/1998 | Holland | 219/202 |
| 5,832,558 | 11/1998 | Ehret et al. | 219/202 |

Primary Examiner—Teresa Walberg
Assistant Examiner—Fadi H. Dahbour
Attorney, Agent, or Firm—John P. Halvonik

[57] ABSTRACT

A heated windshield wiper unit having an improved electrical heating element. The wiper may be constructed as a wiper blade constructed of silicon material for attachment to existing wiper blade frame supports that are already standard for automobiles and other vehicles. Inside a hollow core of the wiper there is a nickel-chromium alloy resistive wire with a polyimide insulative sheath for generating heat to melt the ice and snow. Copper leads are connected to the resistive wire by means of silicon sheath. The leads from the wiper blade are connected to the electrical system of the vehicle for after market use.

1 Claim, 3 Drawing Sheets

HEATING ELEMENT FOR HEATED WINDSHIELD WIPER

FIELD OF THE INVENTION

The invention relates to the field of windshield wipers, and in particular to an improved heated windshield wiper that will effectively heat the wiper and melt snow and ice without risk of deteriorating the coating on the heating elements.

BACKGROUND AND PRIOR ART

While there are heated windshield wiper that use electrical heating elements in the wiper, there are none that are known to the applicant that provide a Kapton coated chromium wire heating element (KAPTON is a trademarked name of DuPont Corp. for a polyimide based coating film). Nor are there any inventions known in the prior art that utilizes a heat shrink process in order to attach the heating element to the electrical leads of the automobile. Nor are we aware of any inventions in the prior art that use silicon sheaths to connect the lead wires to the heating elements in the wiper.

It is believed that the use of a Kapton coated chromium heating element in a heater wiper blade will provide an improved wiper designs that will safely generate more heat than prior heater wiper designs without danger of deterioration or other damage to the wire heating elements. It is also believed that the use of a heat shrink process is a superior method of attaching the wire leads to heating elements.

SUMMARY OF THE INVENTION

The invention is a heated windshield wiper having an improved electrical heating element. The wiper may be constructed as a wiper blade for attachment to existing wiper blade frame supports that are already standard for automobiles and other vehicles. Inside a hollow core of the wiper there is a copper wire and a Kapton coated resistive wire for generating heat to melt the ice and snow. The leads from the wiper blade are connected to the electrical system of the vehicle. A switch may be used in connected with the electrical system to provide a way for the driver to turn on the heated blades when needed.

It is an object of the invention to provide a heated windshield wiper that can generate more heat than existing systems by using higher resistance wires that can generate large amounts of heat without deteriorating or being damaged during operation.

It is another object of the invention to manufacture a heated windshield wiper with savings over manufacturing costs associated with other heated wipers that use wire heating elements.

Still another object is to provide a connecting link between heating elements in the wiper and the electrical leads that will not crack or deteriorate under low temperatures up to 100° below freezing.

Another object is to provide heated windshield blades that can be retrofitted into existing wiper blade systems with a minimum of effort on the part of the consumer.

Another object of the invention is to provide heated windshield blades that will avoid the build up of ice directly on the blade and thus allowing the heated wiper blade to make uninterrupted contact with the windshield during the wiping process.

DESCRIPTION OF THE PREFERRED EMBODIMENT

The heated windshield wiper of the present invention are constructed as wiper blades that are designed to be attached to existing wiper blade supports (10 in FIG. 1) without having to modify the elements of the windshield wiper system. Note the arms of the wiper blades are shown as 9 in FIG. 2. Existing non-heated wiper blades do need to be removed from the frames, thus the consumer replaces the wiper blades with the heated blades of the invention and then connects the wire leads from the blades to existing wire systems already in place on the automobile.

Figure 1:
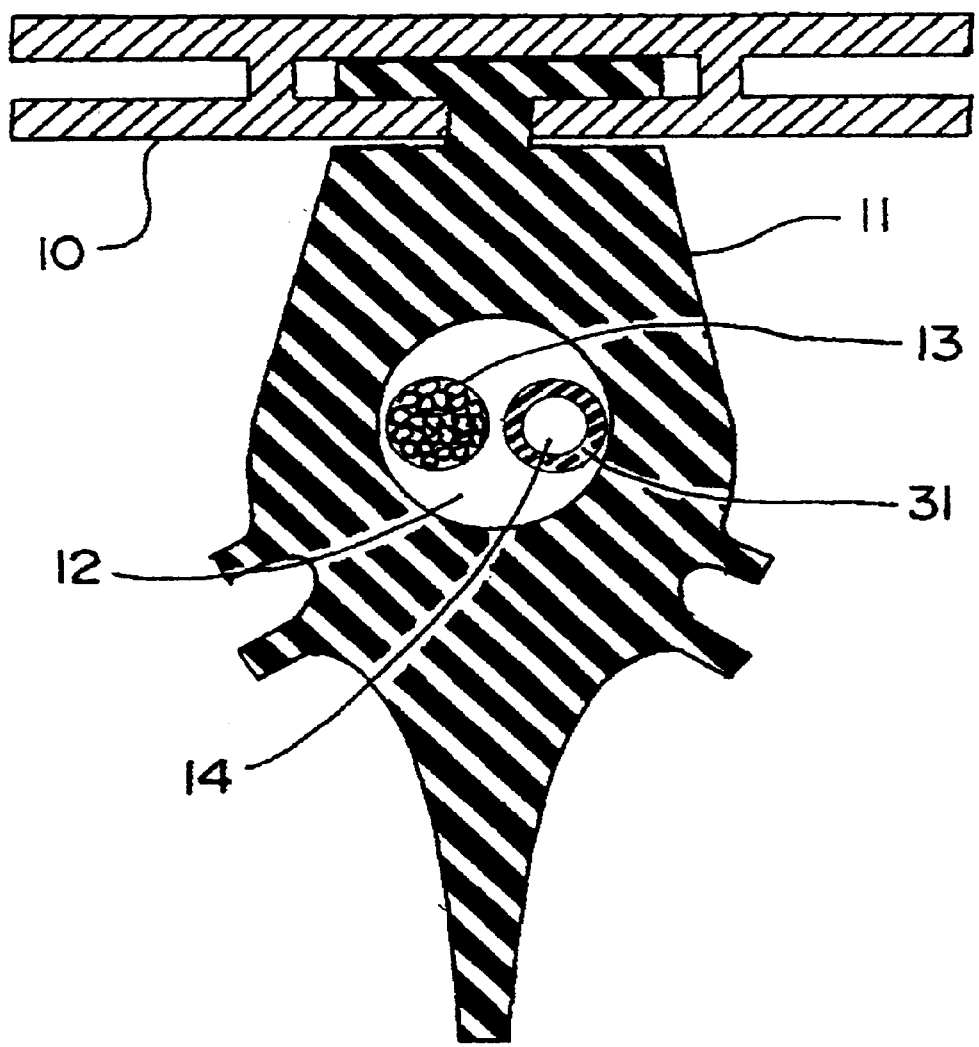
FIG. 1 cross section of hollow wiper blade with heating element components.

The hollow body of the wiper is shown in FIG. 1. It is preferred that the body be made of silicone, however other materials that can transmit heat and not deteriorate under extreme temperatures maybe used without violating the spirit of the invention. The hollow portion runs the entire length of the wiper body and will contain a pair of wires as shown as 13 and 14 in FIG. 1. The wiper body 11 is attached in the normal manner to the standard blade frame support which includes clips, and other mechanical means of joining the blade to the wiper frame.

Inside the hollow space are wires including the resistance wire 14 which generates heat as current flows and a copper wire 13. The wire 13 is a lead that serves to bring the circuit to ground. There is another copper lead 15 that connects the resistive wire 14 to the "hot" portion of the vehicles electric system. Thus, copper wire 13 is the only copper wire that runs inside the body of the blade.

The resistive wire 14 generates a significant amount of heat when a current is passed through it. IT is preferred that the resistance wire be a 25 millimeter diameter Chromel P wire with a Kapton insulation sheath fused to the wire itself. One such provider of such Chromel P wires is the Pelican Wire Co. of Naples, Fla. Other Chromel P wires may be used as the resistive heating element without varying from the spirit of the invention.

Figure 2:
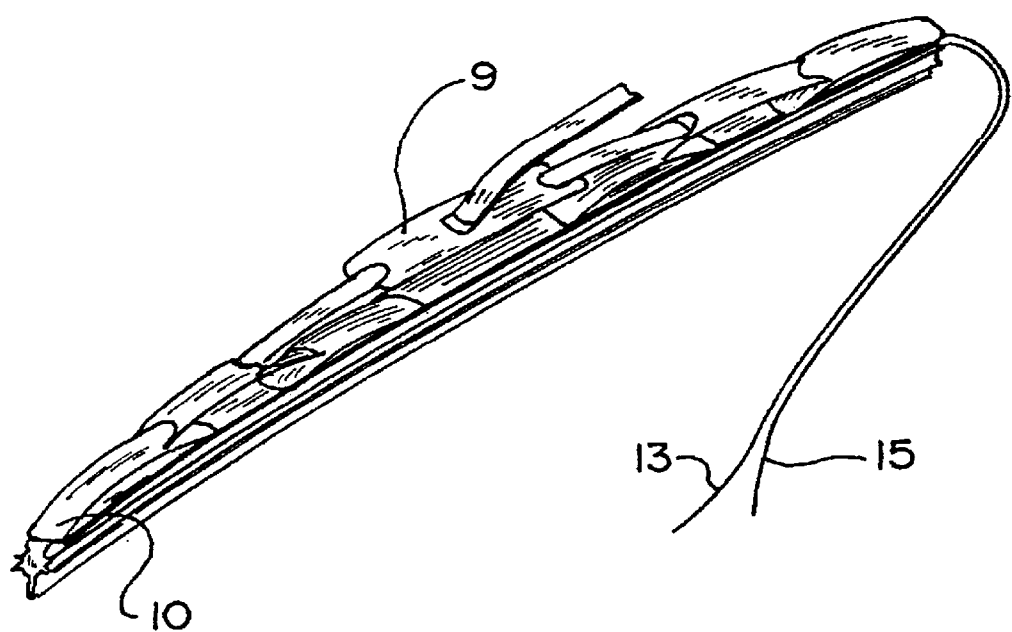
FIG. 2 perspective view of wiper blades.

A heat shrinkable film such as heat shrinkable silicon film may be used to mechanically bond both of the copper wire leads 13 and 15 to the resistive wire 14. The heat shrinkable film also serves to add size to the wire arrangement so that it will take up more space within the hollow body 12 and hence fit more snugly. The hollow body core of the wiper is shown as 12. Both leads 13 and 15 protrude from the wiper blade as seen in FIG. 2, they may be made of different colors (e.g. red and silver) to distinguish them. The lead 15 completes the circuit formed by wire 14 and 13 in connection with the main power supply. 13 brings the circuit to ground, by attachment to auto chassis or other method.

Each of the copper leads will be attached to a different end of the resistive wire 14. Thus one of the copper wires 13 or 15 will be of necessity be of longer length than the other so that it may be attached to the far end of 14. The longer wire, for example 13, would then return back within the blade so that it comes out of the blade at the same end of the blade as 15. Wire 13 should thus run outside of the heat shrinkable film layer containing the resistive wire.

Figure 3:
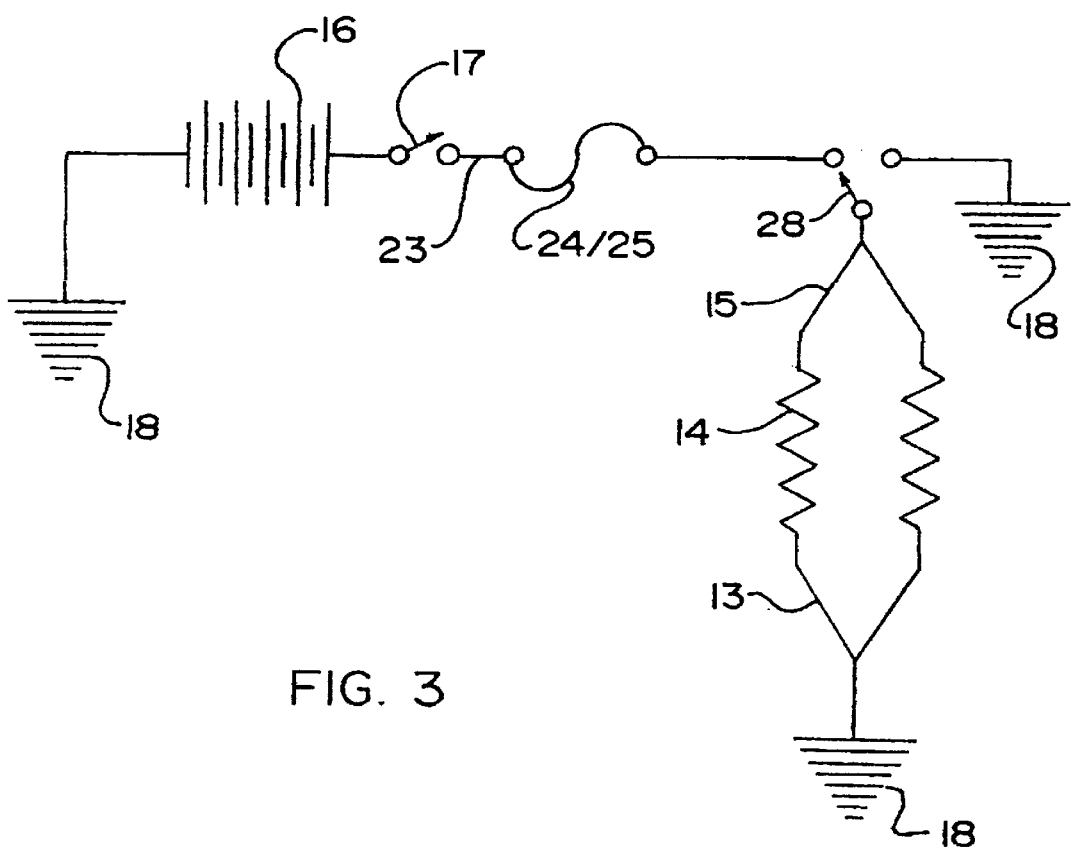
FIG. 3 electrical schematic.

Note; the resistance of the copper wire is depicted as part of the resistive element 14 in FIG. 3. The chromel P wire is also depicted as element 14 in FIG. 3. Note also that two wipers, each with its own leads and resistive elements are depicted in FIG. 3. The chromel wire provides the majority of the resistance. The copper wires are of lower resistance and produce little heat when the current runs through it, hence they are safe to use as the leads as these will not heat surrounding material.

The use of the Chromel P wire should generate a large amount of heat when current is passed through it without danger of deteriorating or otherwise damaging the wires and surrounding materials. By choosing an appropriate gauge of wire (25 mm, in this case being preferred) a temperature of approximately 217° F. can be generated safely. Other effective temperatures may also be used as determined by trial and error. Use of this heating element makes for advantages over the prior art whose heating elements cannot generate similar amounts of heat without risking damage to the wire and hence raise serious safety concerns. The applicant's heating element generates larger amounts of heat than prior art without attendant drawbacks.

FIG. 2 shows the heating element leads 13 and 15 where they protrude from the end of the heated wiper body. The positive lead 15 may be hooked up in either of two ways. 1) from the positive post of the battery 16, usually found under the hood; 2) from the hot bar of the fuse block 24/25. Note the ignition switch, standard in most automobiles, is shown as 17 in FIG. 3.

The main power supply wire 23 of the auto and shown in FIG. 3 is attached to the control switch 28 which may be a lighted switch. The control switch 28 has three connective leads, with two attached to the main supply wire and the third lead should be grounded to, for example, the chassis or other grounding portion 18 of the vehicle. The control switch is used by the driver to turn on the system of heating when it is deemed necessary. Once ice has been melted, the control switch may be turned off and the wiper will return to ambient temperature. Once the control system has been incorporated into the vehicle's electrical system, the heated wiper blades may be refilled as needed by the same or similar heated blades.

The main power supply wire 23 has an in line fuse 24 shown in FIG. 3 which may be e.g. a 5 amp fuse to protect the system from electrical fire hazard. The main power supply wire 23 attached to either the positive post of the vehicle battery or the positive bar of the fuse block to supply 12 volt DC power for the operation of they system.

The leads may be disconnected in summer when the system is no longer needed. The entire blade need not be removed.

I claim:

1. Electrically heated windshield wiper blades for use in connection with the electrical system of a vehicle, said blades comprising: wiper blade body having a hollow interior, a first resistive heating wire comprised of a nickel-chromium alloy wire; said resistive wire having a pair of ends, said resistive wire running within said hollow interior; a pair of copper wire leads, each of said leads in connection with one of said ends of said resistive heating wire, one of said wire leads in connection with the electrical power system of said vehicle and the other of said leads in connection with a source of ground, said resistive wire having an insulative sheath comprised of a polyimide based coating sheath fused to said resistive wire; said blade body constructed of silicon material; said copper wire leads joined to said ends of said nickel-chromium alloy wire by means of a silicon sheath that overlaps said alloy wire and said copper wire lead.

* * * * *